United States Patent [19]

Jones

[11] Patent Number: 5,076,245
[45] Date of Patent: Dec. 31, 1991

[54] FUEL PRESSURE CONTROL SYSTEM FOR GASEOUS FUEL ENGINES

[75] Inventor: James S. Jones, Richardson, Tex.
[73] Assignee: David P. Ward, Dallas, Tex.
[21] Appl. No.: 561,114
[22] Filed: Aug. 1, 1990
[51] Int. Cl.⁵ .......................................... F02M 21/02
[52] U.S. Cl. ..................................... 123/527; 137/907
[58] Field of Search ................... 137/489, 489.5, 907; 123/27 GE, 179 G, 142.5 R, 525, 527

[56] References Cited

U.S. PATENT DOCUMENTS

| | | | |
|---|---|---|---|
| 3,990,432 | 11/1976 | Haynes et al. | 126/392 |
| 4,289,106 | 9/1981 | Parietti | 123/527 |
| 4,813,394 | 3/1989 | St. Clair | 123/527 |

FOREIGN PATENT DOCUMENTS

| | | | |
|---|---|---|---|
| 60-17261 | 1/1985 | Japan | 123/527 |
| 8000238 | 7/1980 | Netherlands | 123/527 |

*Primary Examiner*—Noah P. Kamen
*Attorney, Agent, or Firm*—Daniel V. Thompson

[57] ABSTRACT

This invention has an inlet for either gaseous or liquified gases (LP gas requiring a vaporizer within the system) with the proper passages from the inlet to a back seated fuel valve which is opened by a pressure differential (vacuum from the idle system) across a diaphragm engaging a lever which moves a sealed actuating pin inward to open the fuel valve allowing gaseous fuels to move to the outlet through a proper confining passage. Placed between the outlet and the vacuum chamber of the fuel valve diaphragm is a chamber divided by a free floating diaphragm providing two chambers, one chamber is either balanced for air cleaner resistance or vented to the atmosphere, the other chamber having a free passage to the outlet and a passage in the center of the chamber, having communication with the vacuum side of the fuel valve diaphragm, which is throttled by the floating diaphragm diluting the idle vacuum signal to position the fuel valve.

13 Claims, 3 Drawing Sheets

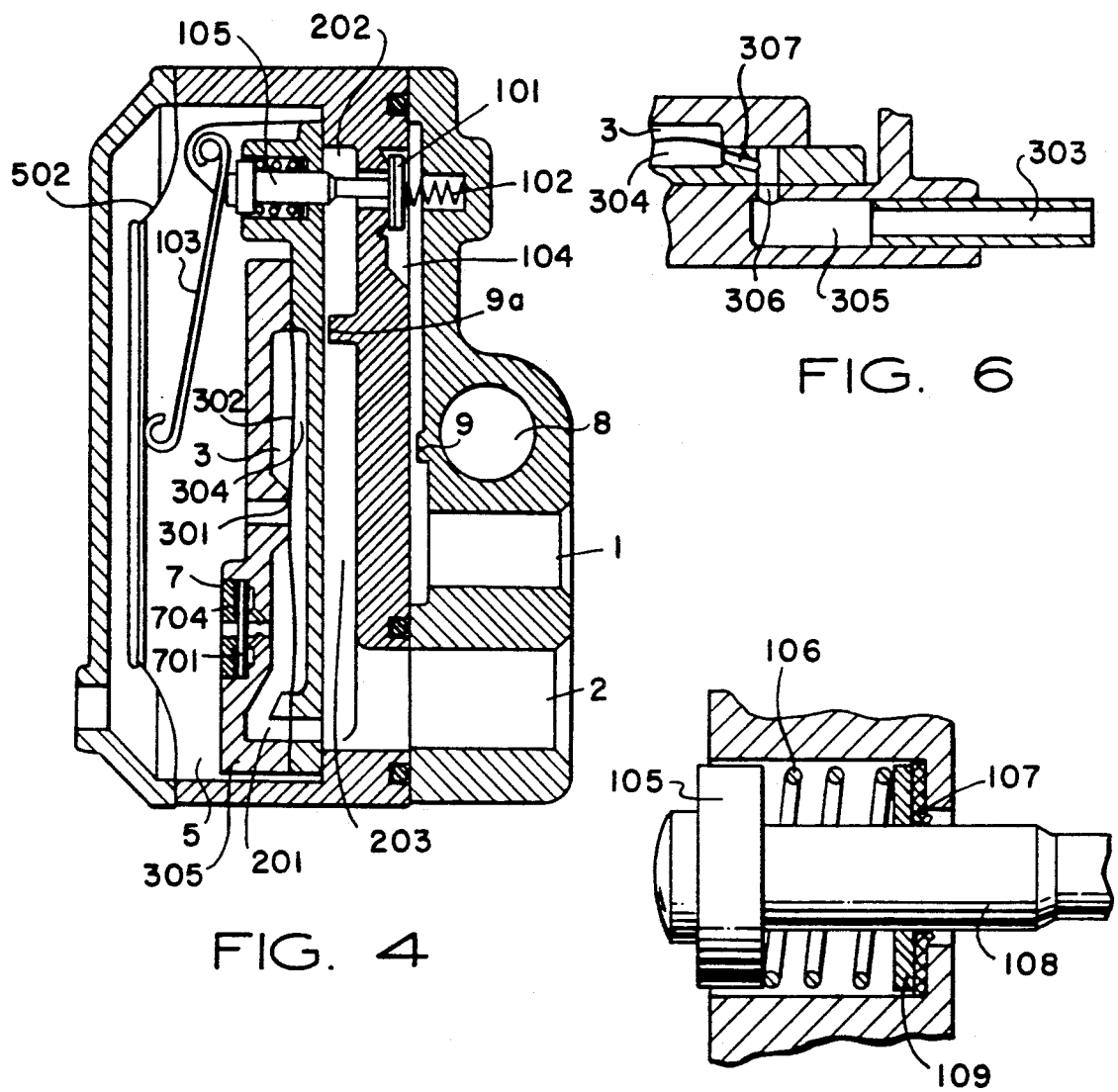
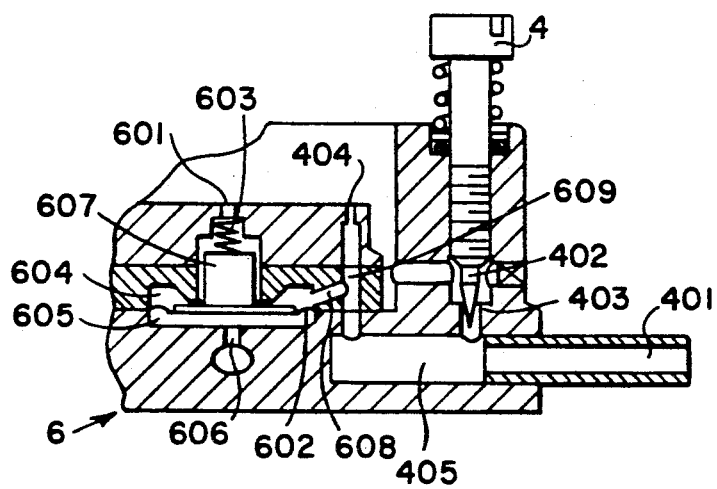

FUEL PRESSURE CONTROL SYSTEM FOR GASEOUS FUEL ENGINES

FIELD OF INVENTION

This invention relates to gaseous fuel metering devices for internal combustion engines, and more particularly to an improved fuel pressure control system for gaseous fuels using forces available from the idle system to open the fuel valve for all operating modes other than starting and rapid full throttle no or very light load accelerating, with the positioning of the fuel valve controlled with the fuel delivery pressure of the main fuel path of the device for all operating modes.

BACKGROUND OF THE INVENTION

Conventional pressure controls for gaseous fuel systems, whether for vaporizing liquid LP or for dry gas at high pressures, typically use at least two pressure regulators in series. The upstream regulator, referred to as the primary, can be a pressure regulator that delivers fuel at pressures from a few inches of water to several pounds. The secondary regulator prepares the fuel to be received by the air. The secondary regulator can be a simple demand regulator that delivers fuel upon a vacuum signal through the fuel supply hose to a venturi device, or it may be built into the carburetor. The secondary regulator contained within a carburetor may be a simple demand regulator, or a charge forming device that reads the pressure drop across a venturi and provides a pressure feed to the main fuel orifice that is related to the venturi pressure drop, or an air/fuel proportioning device that opens both the air leg and the fuel leg upon the engine's demand, with the fuel leg completely closed at rest.

The predominant control configuration today combines the primary and secondary regulators within one housing, with or without vaporizer. The primary regulator uses a throttling valve controlled by a diaphragm to provide fuel at pressure to the secondary regulator of 2-8 PSIG and closes against the flow, so arranged that a pressure rise acting against the diaphragm will increase the closing force on the valve. The secondary regulator is a demand regulator whose valve closes against the flow with the diaphragm attached to the valve lever so that any delivery pressure rise greater than ambient will act to close the valve.

One system having a venturi carburetor uses a cantilever wire spring attached to the secondary valve lever that is adjusted with a screw to cause the secondary to pass gas for idle. A spring loaded vacuum responsive diaphragm is positioned below the secondary lever to overcome the cantilever spring closing the valve when the system is at rest.

The predominant control configuration is used to feed fuel to diaphragm controlled proportional mixers, proportional mixers that feed fuel below the throttle plate as well as all types of adapters and carburetors using venturis.

The vacuum at the outlet required to open the secondary regulator of 0.5-1.5 inches water is satisfactory with the diaphragm controlled mixers which require 6 inches water vacuum to open. The proportional mixers work well with this control, except with systems requiring full throttle starting, where even if the engine pulls 3 or 4 inches water vacuum at cranking the air/fuel mixture would be too lean to start.

The conventional control used with venturi systems must have an idle system with either an idle progression or an undersized venturi to eliminate a lean spot off idle and will never cold start without some type of assist.

The ideal control system would be one functional with all the systems in their simplest forms, and include the following features:

A. Complete control of fuel over the entire operating range.
B. Starting ability at any throttle position when used with any type of gas carburetor or adaptor.
C. The ability to trim the idle fuel with venturi systems.
D. The ability to keep the fuel valve closed except upon engine demand.

The safety requirements for shut-down of a system require a fuel shut-off that must be opened by the engine's demand and must be arranged so that manual starting assist systems (hand and solenoid primers) cannot override this shut-down system. The accepted art is either a separate vacuum operated shut-off valve device which also houses the system's filter or a liquid solenoid valve that uses a vacuum switch or an oil pressure switch to prevent the flow of fuel with the ignition switch on when the engine is not running.

There have been attempts to incorporate a solenoid valve into the converter, but at light engine loads the vaporizing upstream of the solenoid frees the iron oxide power which accumulates in the magnetic field and restricts the valve opening.

Solenoid shutoffs are ideal for systems using two fuels (dual fuel) which require electronic fuel selection; the vacuum locks use a solenoid valve in the vacuum line for fuel selection when used on duel fuel systems.

The valve of a shutoff system should not be throttled against its seat to control the quantity of fuel required. Any contaminant unable to pass between the valve and its seat at shutdown is likely to become imbedded in the soft rubber valve when the valve receives the fuel closing load reducing the useful valve life.

SUMMARY OF THE INVENTION

The present invention has neither a primary regulator nor a secondary regulator, but uses instead a backseated fuel valve that receives fuel at its stored pressure and is opened by the engine's vacuum across a small restricting orifice acting on a diaphragm that is isolated from the main gas path except by way of a small orificed valve seat, and which is throttled by a zero pressure diaphragm which reads the ambient pressure on one side and the fuel delivery pressure on the valve seat side, and bleeds down the vacuum acting on the fuel diaphragm to position the fuel valve, thereby controlling the fuel delivery pressure which is a few thousandths of an inch of water.

A small idle trim communication link between the engine's manifold and the fuel valve diaphragm chamber is provided, but this link does not provide sufficient flow to provide a quick dependable start; therefore, a vacuum responsive, normally open, spring loaded diaphragm valve that closes at about 10 inches water vacuum is placed between the diaphragm chamber and the engine's manifold to provide quick dependable starts with all types of air/fuel mixers (venturi-air valves).

During rapid acceleration there is the possibility that the delivery fuel pressure may be momentarily reduced to a vacuum that exceeds the vacuum required to open the fuel valve, which would result in a hesitation. A sensitive back check valve is placed between the fuel outlet and the fuel valve diaphragm chamber allowing the fuel valve to be momentarily opened further by the vacuum provided by the sudden filling of the engine's manifold.

BRIEF DESCRIPTION OF THE DRAWINGS

A more complete understanding of the invention and its advantages will be apparent from the Detailed Description taken in conjunction with the accompanying Drawings in which:

FIG. 4 is a sectional view taken along lines 4—4 in FIG. 2;

FIG. 5 is a partial sectional view taken along lines 5—5 in FIG. 2, showing the starting assist and idle trim;

FIG. 6 is a partial sectional view taken along lines 6—6 in FIG. 2, showing the ambient vent of the zero pressure diaphragm;

FIG. 7 is an enlarged partially broken away side view of the fuel valve actuating pin and wiper;

FIG. 8 is an enlarged partially broken away side view of the check valve;

DETAILED DESCRIPTION OF THE PREFERRED EMBODIMENT

Figure 1:
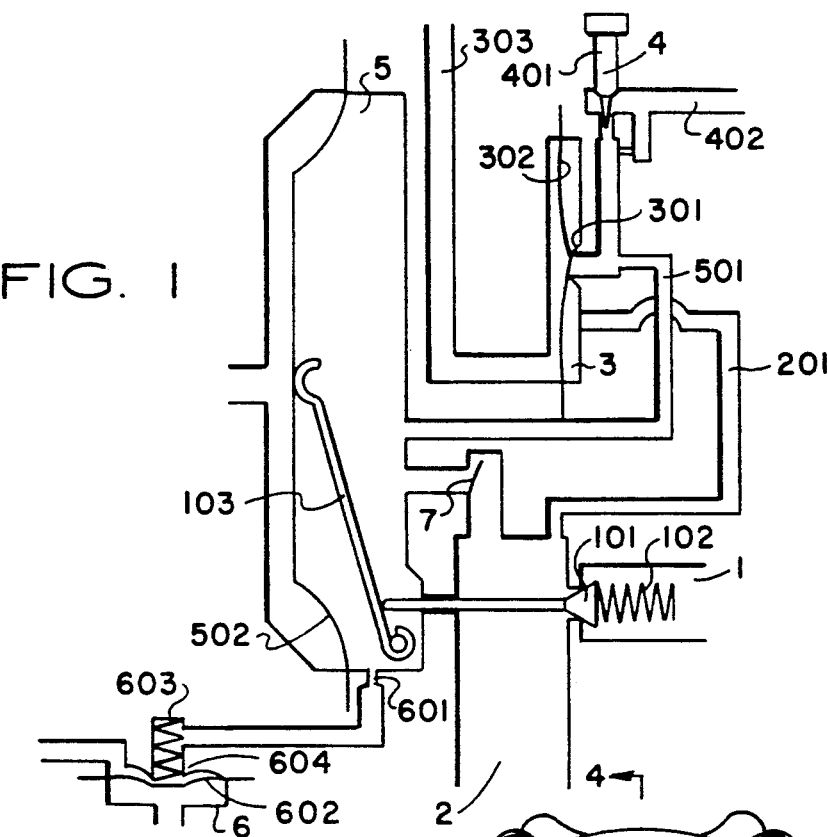
FIG. 1 is a schematic of the pressure control system of the present invention without a vaporizer.

Referring initially to FIG. 1, the illustrated system receives at inlet 1 LP gas in its vapor phase at tank pressure. When at rest, back seated fuel valve 101 is closed by spring 102, with fuel pressure acting on the valve preventing the movement of fuel from inlet 1 through outlet 2. During normal engine operation, there is a movement of fuel from the outlet 2 through passage 201 into the zero pressure control chamber 3, where it is throttled at orificed valve seat 301 and diaphragm 302 before it moves across idle trim 4. Idle trim 4 includes idle trim screw 401 and idle trim passageway 402 leading to the intake manifold. The fuel valve diaphragm chamber 5 is evacuated by the engine's manifold vacuum acting across the idle trim 4 through passage 501, and fuel valve 101 is opened by fuel valve diaphragm 502 acting on fuel valve lever 103.

The system provides a fuel pressure base for metering that can be expressed as the ambient pressure plus:

$$\frac{\text{(area of valve seat 301)} \times \text{(vacuum in chamber 5 (in. H2O))}}{\text{effective area of zero pressure control diaphragm 302}},$$

which will be a few thousandths of an inch of water pressure. Metering of the fuel proportionally to the air flowing is the responsibility of the carburetor or adaptor (not shown).

The actual fuel flowing to the engine will be the fuel across the fuel leg of the carburetor plus the fuel flowing across the idle trim 4 of the control system. The fuel across the idle trim 4 is independent of the main fuel flow and has its maximum quantity during the idle mode. A fixed vacuum orifice may replace the idle trim screw 401 when used with air/fuel proportioning devices which provide idle trim.

Engines equipped with venturi mixing systems or air/fuel proportioning devices that feed the fuel below the air throttle valve, requiring automatic starts at full throttle, present a problem with conventional demand regulators. Should an engine be equipped with a demand regulator, having a balance line to remove the air cleaner resistance from the air signal, requiring 1.0 inch water vacuum to feed fuel with an air/fuel base of 16.5 to 1.0 and capable of producing an air signal of 4 inches of water vacuum at cranking, the air/fuel ratio would become 19.0 to 1.0 which would not provide dependable starting. The system whose fuel delivery pressure is controlled by the zero pressure diaphragm 302 with a balance line, leaves the fuel valve diaphragm 502 unbalanced thereby using the air cleaner resistance to assist in opening the fuel valve 1. The small quantity of idle trim fuel (0.2 to 0.5 lbs. per hour) being sonic during the idle mode requires a rather small opening across the trim screw 401 and its seat. A manifold vacuum of 20 inches and an idle trim fuel quantity of 0.4 lbs. per hour would represent 1.67 cubic inches per second to move the fuel diaphragm, at 0.25 inches of manifold vacuum there is but 0.324 cubic inches per second (0.078 lbs. hour) available to move the fuel diaphragm 502 which would not provide ideal starting.

To alleviate such problem, a starting assist 6 is placed between diaphragm chamber 5 and the engine's manifold with a restricting orifice 601. The assist has a diaphragm 602, an opening spring 603 and a seat 604 which is closed by diaphragm 602 when the pressure difference across the diaphragm 602 becomes 0.75 inches hg. Orifice 601 is so sized to provide a 0.7 to 1.0 lbs. fuel per hour at 0.75 inches hg. manifold vacuum providing an additional 3.1 cubic inches per second at 10 inches water manifold or 1.75 cubic inches at 3.0 inches water manifold or about 0.4 lbs. additional fuel per hour. At all operating modes other than starting, a manifold vacuum of 0.75" or less prevails at engine speeds well below the engine's torque peak and are therefore unobtainable with torque converters. Even with a one liter engine at maximum power and 1,000 RPM, the shift of air/fuel would be about 2.5 ratios (from 14.8 to 12.3) across the idle leg. Increasing the time required to evacuate chamber 5 could cause a fuel delivery lag, therefore, a sensitive back check valve 7 is placed between the fuel outlet 2 and the diaphragm chamber 5. Any time the vacuum in outlet 2 exceeds the vacuum in chamber 5, check valve will open the fuel valve increasing the fuel pressure in outlet 2 restoring normal operation.

Figure 2:
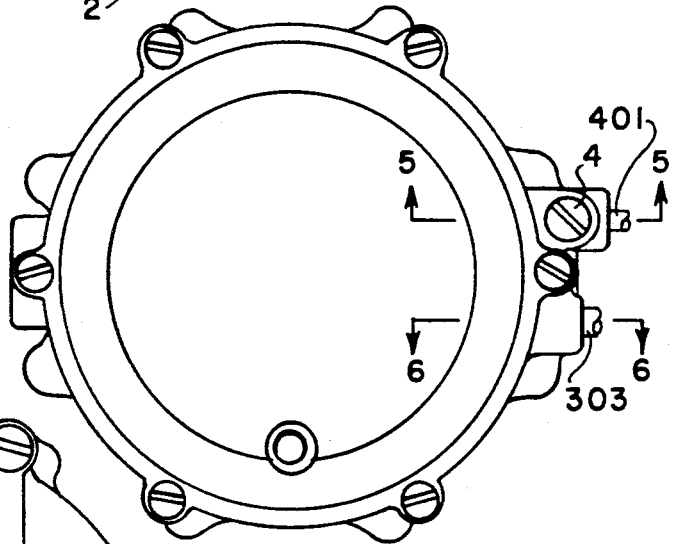
FIG. 2 is a front view of a device containing both the pressure control system of the present invention and a vaporizer.
Figure 3:
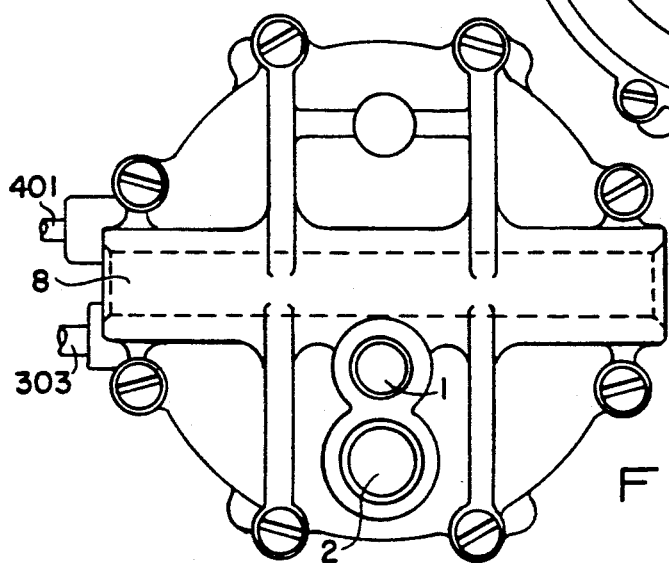
FIG. 3 is a rear view of the device of FIG. 2.
Figure 9:
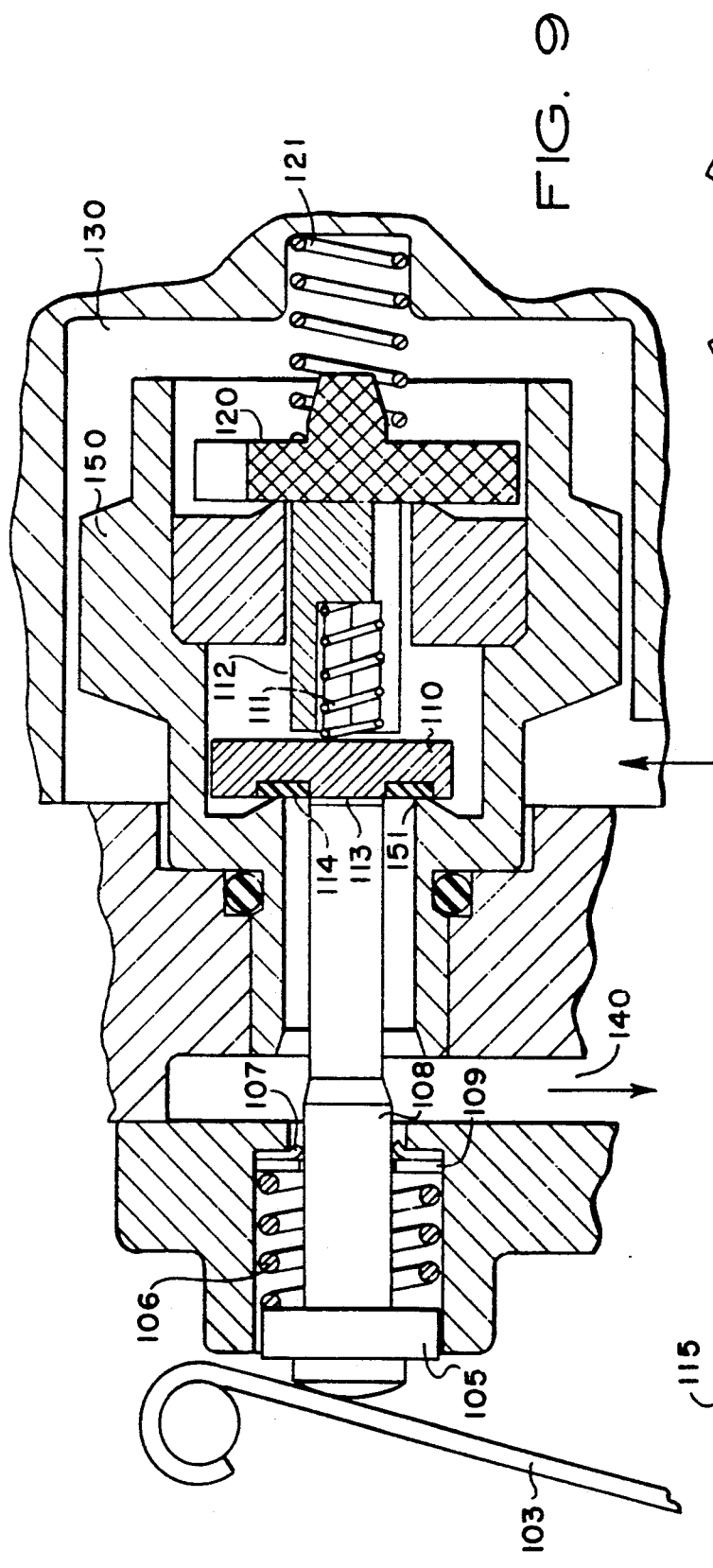
FIG. 9 is an enlarged partially broken away side view of a shutoff valve in series with a throttling valve, using a common diaphragm.

Referring now to FIGS. 2 through 7, an embodiment which includes both the control system of the present invention as well as a film vaporizer is shown. As shown in FIG. 3, the device includes a liquid fuel inlet 1 and fuel outlet 2 with a passage 8 that allows a free movement of the engine's cooling fluid to pass through it to provide the required heat to vaporize the LP gas. The film vaporizer is described in U.S. Pat. No. 3,990,432, Nov. 9, 1976, Haynes, Housewright and Jones, the disclosure of which is hereby incorporated herein by reference. As shown in FIG. 2, the idle trim screw 4 is connected to manifold connections 401 along with the proper vent connections 303 to provide a balance connection between the ambient side of the zero pressure diaphragm with air stream just upstream from the carburetor or adaptor.

As best shown in FIG. 4, the film vaporizer includes film areas 9 and 9a with film area 9 upstream of fuel valve 101 and film area 9a downstream of the fuel valve. The film vaporizer has the ability to provide a constant quantity of fuel to the fuel valve at any operating mode, and has compact fuel passages having no surfaces or low heat transfer capacities (diaphragms) which could encourage condensation and lead to uneven fuel feeding, which would overwork the control system and cause metering problems when using balance lines.

The engine's cooling fluid passes through passage 8, moving the heat into the unit required to vaporize the liquid fuel. At low fuel demands, all of the fuel is vaporized between the fuel supply system entering at inlet 1 and the film area 9 with some superheating upstream of film area 9, and therefore all of the fuel passing valve 101 is superheated dry gas. As the fuel demand is increased to where the required latent heat can no longer be supplied upstream of the film area 9, the fuel passing the film area becomes a super-saturated vapor with the velocity increasing with increasing demand due to the resistance of the film area to even out the flow across the length of the film area, lowering the dew point and preparing it to receive heat on its way to valve 101.

The pressure difference between fuel passage 202 and outlet 2 is the pressure difference required to move the fuel across the film area 9a. This pressure drop from passage 104 to 202 across valve 101 is accompanied by a temperature drop, and the fuel that could be considered liquid would have a temperature representing its dew point. A pressure of 5.6 PSIG in passage 202 would drop the temperature of any liquid droplets to $-30°$ F. The major pressure drop would be across film area 9a, and there would be a great difference of velocities of the vapor, any liquid droplets allowing these droplets to receive energy from the containing walls as well as the warmer vapor moving around them. The fuel picks up additional heat as it moves to outlet 2 throughout passage 203.

The zero pressure diaphragm 302 divides chamber 304, which has free communication with ambient air or to the main air stream just upstream from the carburetor from chamber 3, which has free communication with outlet 2 across passage 201 and also has controlled communication with chamber 5 by way of seat 301. The idle trim fuel moves from outlet 2 through passage 201 into chamber 3 where it is throttled at seat 301 by diaphragm 302 before entering chamber 5 to control the vacuum which positions fuel valve 101.

Referring now to FIG. 8, located between chambers 3 and 5 is a sensitive back check valve 7 that prevents a flow from chamber 3 into chamber 5 using a disc 701 made from thin but rather stiff diaphragm material, and having two holes 702 to assure communication between the valve seat 703 of retaining seat 704 and the backup valve seat 705, which is formed in control plate 305. A vacuum at outlet 2 that is greater than the vacuum in chamber 5 would unseat disc 701 from seat 703 and would reseat on backup valve seat 705, requiring two passages 706 to move fuel from chamber 5 to outlet 2 to open fuel valve 101, increasing the pressure at outlet 2 moving disc 701 back to seat 703 restoring normal operation.

FIG. 7 shows valve pin 105, which transfers movement of diaphragm 502 to open valve 101. When there is no longer demand for air from the engine, spring 106 moves diaphragm 502 to its maximum outward position with the inward end of pin 105 leaving valve 101, allowing spring 101 to close the valve. To isolate chamber 5 from the main fuel path, a teflon wiper 107 is loaded against the enlarged section 108 of pin 105, which is larger than the hole through the wiper. Washer 109 acts to guide pin 105 and placed between the wiper and the spring 106 which retains them.

FIG. 5 shows idle trim screw 7 having needle point 402 to be adjusted in and out of orifice 403 to provide an idle trim. When idle trim 4 is not required in the system, its function as a communication passageway between the engine's manifold and chamber 5 is replaced with fixed orifice 404.

FIG. 5 also illustrates the starting assist 6, having restricting orifice 601 to provide communication between the engine's manifold with vacuums of 0.75 inches or lower, through connection 401 and chamber 5. A diaphragm 602 separates chambers 604 and 605, with chamber 605 having communication with the main fuel path downstream of film area 9a through passages 606, providing a vent. Spring 603 acts on diaphragm 602 through passages 608, 609, and chamber 604 at all manifold vacuums of 0.75 inches and less, thereby providing greater capacities and quicker response for fast dependable starts.

FIG. 6 shows the vent leg of the zero pressure diaphragm 302. Connection 303 is provided to balance the pressure (vacuum) from the main air stream just upstream of the air reader with the chamber 304, which provides the pressure base of the fuel leg. This connection should always be used with a fixed area air reader (venturi), but may not be necessary with some applications equipped with proportional air/fuel devices which vary the areas. The communication between chamber 304 and connection 303 is through passages 307, 306 and 305.

The fuel valve diaphragm, lever, and valve pin is illustrated in FIGS. 4 and 7.

Referring now to FIGS. 9 through 12, the valve arrangement with an engine at rest includes a back seated shutoff valve 110 closed by spring 111 and the system pressure across it. Throttling valve 120 is also closed by spring 121 which is stronger than spring 111, allowing the closing of valve 120. Upon the engine initial demand for fuel, its vacuum acting on the fuel diaphragm moves lever 103 inward against pin 105 and spring 106 and brings the end of pin 105 in contact with the shutoff valve 110. When force is applied to unseat valve 110, it moves inward against spring 111, picking up force transfer piston 112 to unseat throttling valve 120 against the pressure difference across valve 120 and spring 121, allowing the movement of fuel from the high pressure side 130 to the low pressure side 140, and providing the fuel pressure to allow the control diaphragm 302 to throttle valve 120.

This arrangement provides a system having two backseated valves in series, with the downstream valve being bubble tight, and with the upstream valve being of hard plastic and considered not bubble tight. Any normal leak across valve 120 will not supply the fuel requirements for idle or starting.

The total resistance across orifices in series is expressed as the square root of the sum of the resistance of each orifice squared, with the percent of the total pressure drop across each orifice expressed as its resistance over the total system resistance. The shutoff-throttling valves are the only controls within the main fuel path of the system and the majority of the heat enters the system upstream of these valves. Under normal operating conditions, there is never a temperature drop in the system until the pressure drop across the two valves. As the fuel demand increases, the fuel conditions across the valves change from a superheated vapor to a saturated vapor, to a super saturated vapor and super saturated vapor where liquid will accumulate on the shutoff valve 110, and its temperature will become the liquid's dew point at the pressure between the two valves. A temperature much below $-25°$ F. is less than desirable for the most common synthetic soft seat materials; therefore, a minimum opening of valve 110 prior to the opening of valve 120 is desirable to maintain a higher temperature between the two valves.

The following figures are based on the thermodynamic properties of saturated propane with the Lee Company's Lohm Concept for the resistance to flow across orifices in series and with valves having a diameter of 0.218", with a shutoff valve lift of 0.005" prior to opening of the throttling valve, and a downstream pressure considered to be 1.5 PSIG with a dew point of $-40°$ F.:

- 50 PSIG, Throttle opening 0.001", midstream pressure 7.13 PSIG, dew point $-27°$ F., lbs. fuel per hour 3.82 dry gas.
- 50 PSIG, Throttle valve opening 0.003", midstream pressure 13.6 PSIG, dew point $-15°$ F., lbs fuel per hour 6.78 dry gas.
- 100 PSIG, Throttle valve opening 0.001", midstream pressure 14.2 PSIG, dew point $-12°$ F., lbs. fuel per hour 6.78 dry gas.
- 100 PSIG, Throttle valve opening 0.006", midstream pressure 35.4 PSIG, dew point $+15°$ F., lbs. fuel per hour 36.2 dry gas.
- 250 PSIG, Throttle valve opening 0.006", midstream pressure 88.5 PSIG, dew point $+15°$ F., lbs. fuel per hour 83.57 saturated gas.

Figure 12:
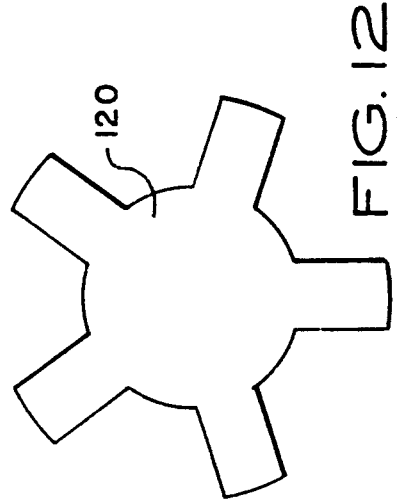
FIG. 12 is a front view of the throttling valve.
Figure 11:
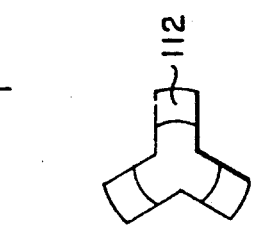
FIG. 11 is an end view of the force transfer piston.
Figure 10:
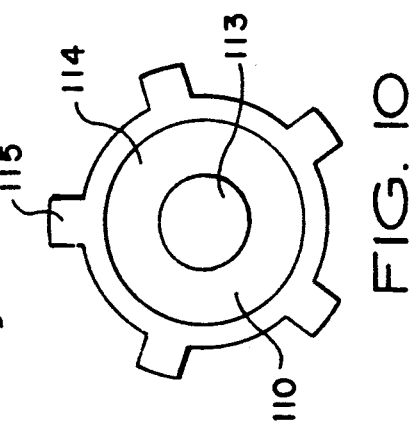
FIG. 10 is a front view of the shutoff valve of FIG. 9.

In operation, the inward end of pin 105 contacts metal center post 113 (FIG. 10) to unseat at the soft inlay 114 of valve 110 from valve seat 151 of valve cage 150. Valve 110 is guided by rails 115 extending outward from its circular body to provide openings for movement of fuel by it as it is throttled as a unit with force transfer piston 112 (FIG. 11) and throttle valve 120 (FIG. 12).

Any fuel considered to be in its liquid phase that has crossed the valves will have a temperature representative of its dew point at the system's pressure (1.50 PSIG = $-40°$ F.). Any accumulation of liquid between the two valves will have a temperature representative of the liquid's dew point at the pressure between the valves.

The only fuel throttled by the shutoff valve is the fuel between the two valves (0.04 cubic inches) upon the engine's demand, which in most cases will be vapor. A saturated vapor between the valves at the system's temperature will provide a zero pressure across the throttling valve. The combining of the shutoff valve with the converter will eliminate one piece of hardware, fittings and brackets, which is a great advantage where there is limited space in the engine compartment.

Whereas the present invention has been described with respect to a specific embodiment thereof, it will be understood that various changes and modifications will be suggested to one skilled in the art, and it is intended to encompass such changes and modifications as fall within the appended claims.

I claim:

1. A fuel pressure control system for gaseous fuel engines, comprising:
   a fuel valve interposed between an inlet passageway adapted for connection to a source of stored gaseous fuel and an outlet passageway adapted for connection to a gaseous fuel metering device;
   said fuel valve being operatively connected to a fuel valve diaphragm having first and second sides;
   said first side of said fuel valve diaphragm being in communication with engine vacuum, and said first side of said fuel valve diaphragm being also in communication with said outlet passageway by way of an orificed valve seat; and
   said orificed valve seat being throttled by a first side of a zero pressure diaphragm having first and second sides, said first side of said zero pressure diaphragm being in communication with said outlet passageway, such that said zero pressure diaphragm bleeds down vacuum acting on said fuel diaphragm to position said fuel valve, thereby controlling fuel delivery pressure in said outlet passageway.

2. A fuel pressure control system for gaseous fuel engines, comprising:
   a fuel valve interposed between an inlet passageway adapted for connection to a source of stored gaseous fuel and an outlet passageway adapted for connection to a gaseous fuel metering device;
   said fuel valve being operatively connected to a fuel valve diaphragm having first and second sides;
   said first side of said fuel valve diaphragm being in communication with engine vacuum, and said first side of said fuel valve diaphragm being also in communication with said outlet passageway by way of an orificed valve seat;
   said orificed valve seat being throttled by a first side of a zero pressure diaphragm having first and second sides, said first side of said zero pressure diaphragm being in communication with said outlet passageway, such that said zero pressure diaphragm bleeds down vacuum acting on said fuel diaphragm to position said fuel valve, thereby controlling fuel delivery pressure in said outlet passageway; and
   said fuel valve being backseated against the flow of gas.

3. The fuel pressure control system of claim 1 wherein said second side of said fuel pressure diaphragm is in communication with ambient pressure.

4. The fuel pressure control system of claim 1 wherein said second side of said zero pressure diaphragm is in communication with ambient pressure.

5. A fuel pressure control system for gaseous fuel engines, comprising:
   a fuel valve interposed between an inlet passageway adapted for connection to a stored gaseous fuel and an outlet passageway adapted for connection to a gaseous fuel metering device;
   said fuel valve being operatively connected to a fuel valve diaphragm having first and second sides;
   said first side of said fuel valve diaphragm being in communication with engine vacuum, and said first side of said fuel valve diaphragm being also in communication with said outlet passageway by way of an orificed valve seat;
   said orificed valve seat being throttled by a first side of a zero pressure diaphragm having first and second sides, said first side of said zero pressure diaphragm being in communication with said outlet passageway, such that said zero pressure diaphragm bleeds down vacuum acting on said fuel diaphragm to position said fuel valve, thereby controlling fuel delivery pressure in said outlet passageway; and a start diaphragm valve interposed between said first side of said fuel valve diaphragm and engine vacuum, said start diaphragm valve being normally open and closeable by engine vacuum to provide sufficient vacuum for starting.

6. A fuel pressure control system for gaseous fuel engines, comprising:

a fuel valve interposed between an inlet passageway adapted for connection to a source of stored gaseous fuel and an outlet passageway adapted for connection to a gaseous fuel metering device;

said fuel valve being operatively connected to a fuel valve diaphragm having first and second sides;

said first side of said fuel valve diaphragm being in communication with engine vacuum, and said first side of said fuel valve diaphragm being also in communication with said outlet passageway by way of an orificed valve seat;

said orificed valve seat being throttled by a first side of a zero pressure diaphragm having first and second sides, said first side of said zero pressure diaphragm being in communication with said outlet passageway, such that said zero pressure diaphragm bleeds down vacuum acting on said fuel diaphragm to position said fuel valve, thereby controlling fuel delivery pressure in said outlet passageway; and a check valve interposed between said outlet passageway and said first side of said fuel pressure diaphragm, said check valve permitting flow from said first side of said fuel pressure passageway into said outlet passageway in the event of rapid acceleration.

7. The fuel pressure control system of claim 1 further comprising an adjustable idle trim orifice interposed between said first side of said fuel valve diaphragm and said communication thereof with engine vacuum.

8. The fuel pressure control system of claim 1 in combination with a film vaporizer.

9. A fuel pressure control system for gaseous fuel engines, comprising:

a fuel valve interposed between an inlet passageway adapted for connection to a source of stored gaseous fuel and an outlet passageway adapted for connection to a gaseous fuel metering device;

said fuel valve being operatively connected to a fuel valve diaphragm having first and second sides;

said first side of said fuel valve diaphragm being in communication with engine vacuum, and said first side of said fuel valve diaphragm being also in communication with said outlet passageway by way of an orificed valve seat;

said orificed valve seat being throttled by a first side of a zero pressure diaphragm having first and second sides, said first side of said zero pressure diaphragm being in communication with said outlet passageway, such that said zero pressure diaphragm bleeds down vacuum acting on said fuel diaphragm to position said fuel valve, thereby controlling fuel delivery pressure in said outlet passageway; and said fuel valve being operatively connected in series with a vacuum operated fuel shutoff valve.

10. The fuel pressure control system of claim 2 wherein said second side of said fuel pressure diaphragm is in communication with ambient pressure.

11. The fuel pressure control system of claim 2 wherein said second side of said zero pressure diaphragm is in communication with ambient pressure.

12. The fuel pressure control system of claim 2 further comprising an adjustable idle trim orifice interposed between said first side of said fuel valve diaphragm and said communication thereof with engine vacuum.

13. The fuel pressure control system of claim 2 in combination with a film vaporizer.

* * * * *